US010586367B2

(12) United States Patent
Ravindran et al.

(10) Patent No.: US 10,586,367 B2
(45) Date of Patent: Mar. 10, 2020

(54) INTERACTIVE CINEMAGRAMS

(71) Applicant: Samsung Electronics Co., Ltd, Suwon-si (KR)

(72) Inventors: Sourabh Ravindran, Dallas, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/650,531

(22) Filed: Jul. 14, 2017

(65) Prior Publication Data

US 2019/0019320 A1 Jan. 17, 2019

Related U.S. Application Data

(60) Provisional application No. 62/442,132, filed on Jan. 4, 2017.

(51) Int. Cl.
*G06T 13/20* (2011.01)
*G06T 13/80* (2011.01)
(Continued)

(52) U.S. Cl.
CPC .............. *G06T 13/20* (2013.01); *G06T 7/215* (2017.01); *G06T 7/248* (2017.01); *G06T 13/80* (2013.01); *H04N 1/387* (2013.01); *G06T 7/12* (2017.01); *G06T 7/149* (2017.01); *G06T 2207/10016* (2013.01); *G06T 2207/20116* (2013.01)

(58) Field of Classification Search
CPC ......... G06T 13/20; G06T 7/215; G06T 7/248; G06T 13/80; G06T 7/12; G06T 7/149; G06T 2207/10016; G06T 2207/20116; H04N 1/387
See application file for complete search history.

(56) References Cited

U.S. PATENT DOCUMENTS

| | | | |
|---|---|---|---|
| 8,988,422 | B1 | 3/2015 | Hodgins et al. |
| 9,031,328 | B2 | 5/2015 | Schonfeld et al. |

(Continued)

OTHER PUBLICATIONS

"Trigger an animation effect to play", Microsoft, copyright 2016, accessed Sep. 22, 2016, 2 pages. https://support.office.com/en-us/article/Trigger-an-animation-effect-651726d6-9454-4bfd-b8e5-11d84767a6da#OfficeVersion=2016,_2013.

(Continued)

*Primary Examiner* — Amy R Hsu

(57) ABSTRACT

A method, apparatus, and computer readable medium for interactive cinemagrams. The method includes displaying a still frame of a cinemagram on a display of an electronic device, the cinemagram having an animated portion. The method also includes after the displaying, identifying occurrence of a triggering event based on an input from one or more sensors of the electronic device. Additionally, the method includes initiating animation of the animated portion of the cinemagram in response to identifying the occurrence of the triggering event. The method may also include generating the image as a cinemagram by identifying a reference frame from a plurality of frames and an object in the reference frame, segmenting the object from the reference frame, tracking the object across multiple of the frames, determining whether a portion of the reference frame lacks pixel information during motion of the object, and identifying pixel information to add to the portion.

24 Claims, 7 Drawing Sheets

(51) Int. Cl.

| | |
|---|---|
| ***H04N 1/387*** | (2006.01) |
| ***G06T 7/215*** | (2017.01) |
| ***G06T 7/246*** | (2017.01) |
| ***G06T 7/12*** | (2017.01) |
| ***G06T 7/149*** | (2017.01) |

(56) References Cited

U.S. PATENT DOCUMENTS 9,039,410 B2 5/2015 Walker et al.
9,082,229 B1 7/2015 Scholler
9,269,176 B2 2/2016 Blas, Jr.
9,280,844 B2 3/2016 Larkin et al.
9,349,204 B1 5/2016 Menache et al.
9,349,206 B2 5/2016 Niles et al.
9,373,188 B2 6/2016 Amacker
9,397,972 B2 7/2016 Bruns-Bielkowicz et al.
2003/0146915 A1 8/2003 Brook et al.
2005/0038749 A1 2/2005 Fitch et al.
2009/0207175 A1* 8/2009 Warner .................. G06T 13/00 345/473
2010/0158099 A1* 6/2010 Kalva .............. H04N 21/23412 375/240.01
2014/0111662 A1 4/2014 Mashiah
2015/0104113 A1 4/2015 Ugur et al.
2015/0229978 A1 8/2015 Brown et al.
2015/0234464 A1* 8/2015 Yliaho .................... G06F 3/048 345/473
2015/0254281 A1 9/2015 Sauve et al.
2015/0287403 A1* 10/2015 Holzer Zaslansky ........................ G06T 13/205 704/231
2015/0324096 A1* 11/2015 Leblanc ............... G11B 27/034 715/720
2016/0027202 A1* 1/2016 Sudheendra ............ G06F 3/041 345/473
2016/0027219 A1 1/2016 Nuzzi
2016/0180173 A1* 6/2016 Westmacott ....... G06K 9/00765 382/103
2016/0191893 A1 6/2016 Gewickey et al.
2017/0154014 A1* 6/2017 Arnold .................. G06F 3/0481
2017/0223234 A1* 8/2017 Do ......................... H04N 5/272
2017/0285922 A1* 10/2017 Leblanc ............... G11B 27/034
2017/0316256 A1* 11/2017 Kim ................... G06K 9/00765
2018/0025749 A1* 1/2018 Oh ....................... G06K 9/6218 386/278
2018/0068451 A1* 3/2018 Leung ..................... G06T 7/215

OTHER PUBLICATIONS

Barrett, “Polaroid Swing Thinks the World Needs a Better Photo App”, Wired, Jul. 13, 2016, 5 pages. https://www.wired.com/2016/07/polaroid-swing/.

International Search Report and Written Opinion of the International Searching Authority for PCT Patent Application No. PCT/KR2017/015723 dated Apr. 20, 2018; 10 pages.

Extended European Search Report in connection with counterpart European Patent Application No. 17890735.8 dated Dec. 9, 2019, 7 pages.

* cited by examiner

INTERACTIVE CINEMAGRAMS

CROSS-REFERENCE TO RELATED APPLICATION AND CLAIM OF PRIORITY

This application claims priority under 35 U.S.C. § 119(e) to U.S. Provisional Patent Application No. 62/442,132 filed on Jan. 4, 2017. The above-identified provisional patent application is hereby incorporated by reference in its entirety.

TECHNICAL FIELD

This disclosure relates generally to cinemagrams. More specifically, this disclosure relates to generation and interactivity of cinemagrams.

BACKGROUND

A cinemagram or cinemagraph is an image with one or more moving regions, for example, an image that has a portion in which a minor and repeated movement or animation occurs. A cinemagram includes both a motion component where the movement occurs in the image and a static component in which no movement occurs. Cinemagrams have the effect of making an image appear like a video or animation through the use of the subtle movements in a portion of the image while providing the ability to maintain the overall clarity and sharpness typically associated with images. Cinemagrams are commonly created from image frame sequences or short videos. Cinemagrams are typically created manually using image editing software.

SUMMARY

Embodiments of the present disclosure provide for generation and interactivity of cinemagrams.

In one embodiment, a method for interactive cinemagrams is provided. The method includes displaying a still frame of a cinemagram on a display of an electronic device. The cinemagram has an animated portion. The method also includes after displaying the still frame, identifying occurrence of a triggering event based on an input from one or more sensors of the electronic device. Additionally, the method includes initiating animation of the animated portion of the cinemagram in response to identifying the occurrence of the triggering event.

In another embodiment, an electronic device is provided. The electronic device includes a display, one or more sensors, and a processor operably connected to the display and the one or more sensors. The display is configured to display a still frame of a cinemagram. The cinemagram has an animated portion. The processor is configured to identify, after display of the still frame, occurrence of a triggering event based on an input from the one or more sensors; and initiate, in response to identification of the occurrence of the triggering event, animation of the animated portion of the cinemagram by the display.

In yet another embodiment, a non-transitory, computer-readable medium is provided. The non-transitory, computer-readable medium comprises computer code that, when executed by at least one processor of an electronic device, causes the electronic device to cause a display of the electronic device to display a still frame of a cinemagram, where the cinemagram has an animated portion; identify, after display of the still frame, occurrence of a triggering event based on an input from one or more sensors of the electronic device; and initiate, in response to identification of the occurrence of the triggering event, animation of the animated portion of the cinemagram by the display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that applications for creating cinemagrams work well when the motion region is relatively consistent across most frames. For example, the motion region is limited to a predefined area of the image where a repetitive motion is repeated or looped without the motion impacting other areas of the image. Techniques for creating cinemagrams involve segmenting motion regions from still background regions and then blending the motion regions from different frames into the still background frame. Embodiments of the present disclosure recognize and take into consideration that such techniques may produce a poor quality cinemagram (e.g., heavily pixilated from over blending, contain significant artifacts, with holes in background frames, and/or missing objects that should be in motion) when the motion regions have significant displacement from frame to frame or within the motion region the user wants to keep some objects still and other objects in motion.

Embodiments of the present disclosure further recognize and take into consideration that it may be desirable to have interactive cinemagram including cinemagram with a semantic connection between triggering the cinemagram and motion of the cinemagram. Accordingly, embodiments of the present disclosure provide improved techniques for the generation of cinemagrams and provide interactive cinemagrams.

Figure 1:
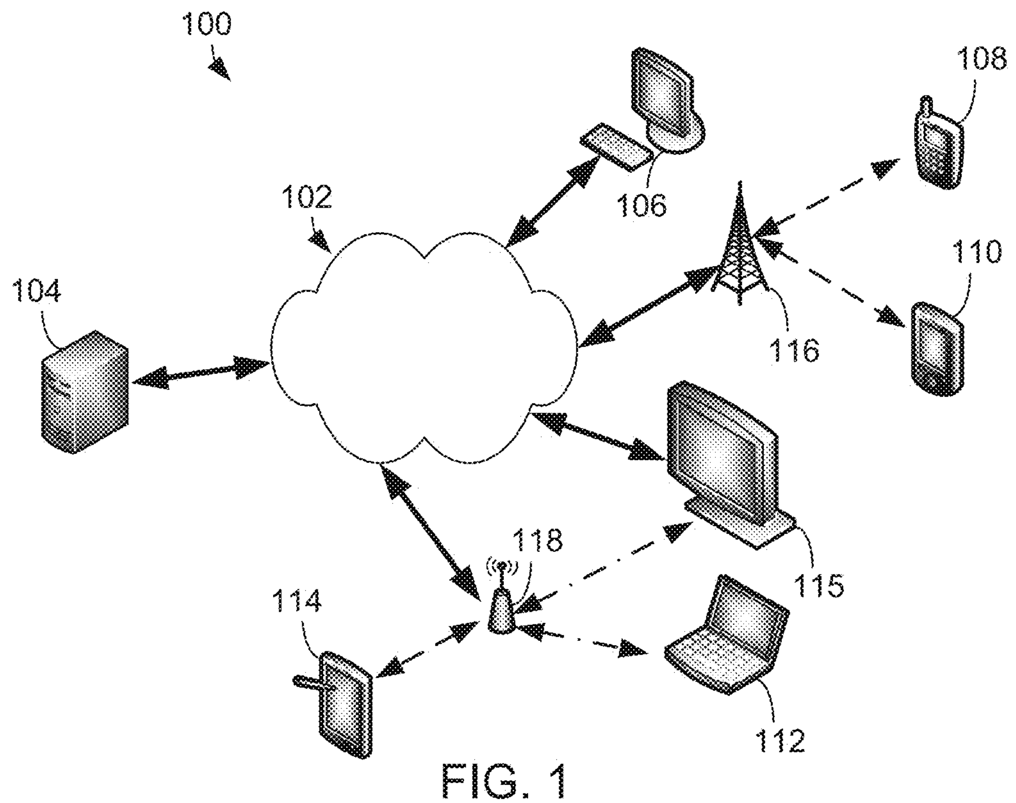
FIG. 1 illustrates an example networked system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 102, which facilitates communication between various components in the system 100. For example, the network 102 may communicate Internet Protocol (IP) packets or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least one server 104 and various client devices 106-115. Each server 104 includes any suitable electronic computing or processing device that can provide computing services for one or more client devices. Each server 104 could, for example, include one or more processing devices, one or more memories storing instructions and data, and one or more network interfaces facilitating communication over the network 102. For example, server 104 may operate one or more applications to generate cinemagrams in accordance with one or more embodiments of the present disclosure. In another example, server 104 may facilitate transfer of cinemagrams and/or images or videos for generating cinemagrams among the client devices 106-115.

Each client device 106-115 represents any suitable electronic computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114; a set-top box and/or television 115, etc. However, any other or additional client devices could be used in the networked system 100. In various embodiments, client devices 106-115 implement techniques for the generation and interactivity of cinemagrams as discussed in greater detail below.

In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a networked system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
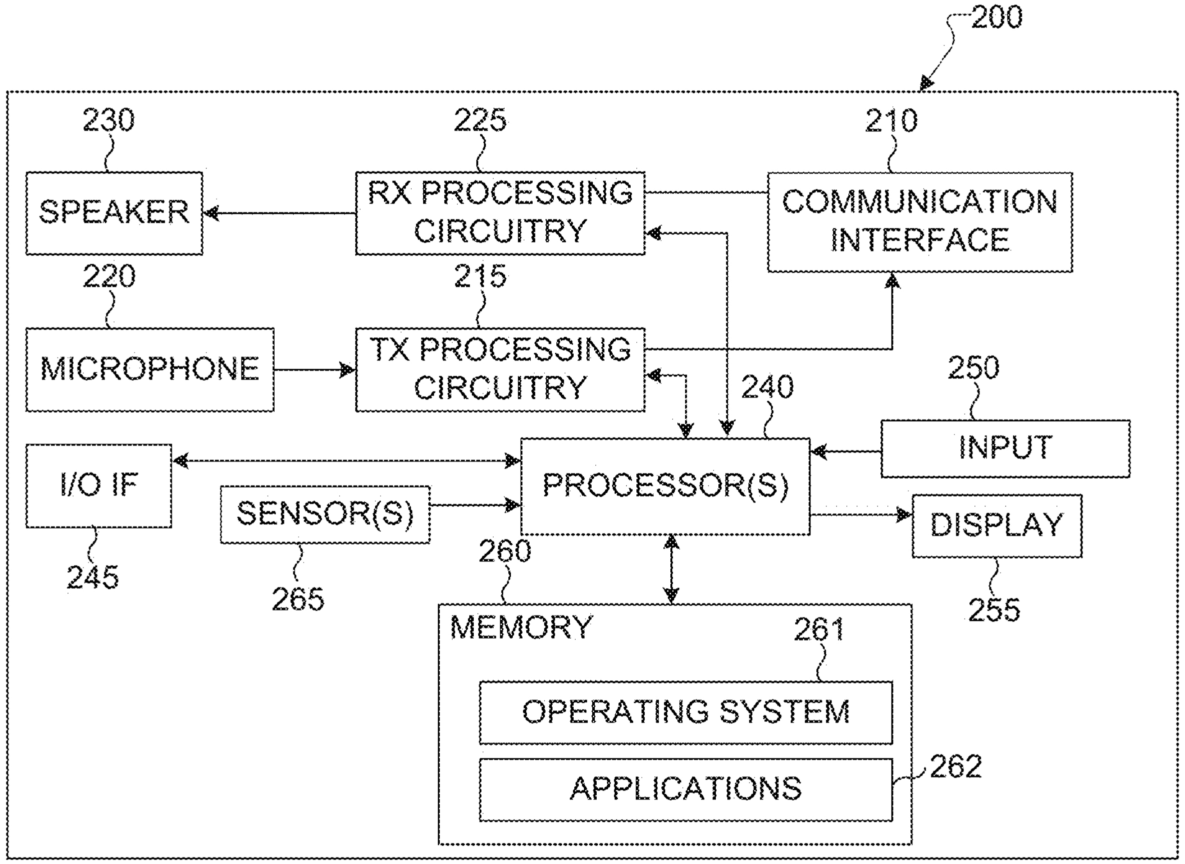
FIG. 2 illustrates an example of an electronic device in which various embodiments of the present disclosure may be implemented.

FIG. 2 illustrates an example electronic device 200 according to embodiments of the present disclosure. The embodiment of the electronic device 200 illustrated in FIG. 2 is for illustration only, and the client devices 106-115 of FIG. 1 could have the same or similar configuration. However, electronic devices come in a wide variety of configurations, and FIG. 2 does not limit the scope of this disclosure to any particular implementation of an electronic device.

As shown in FIG. 2, the electronic device 200 includes a communication interface 210, TX processing circuitry 215, a microphone 220, and receive (RX) processing circuitry 225. The communication interface 210 may include, for example, an RF transceiver, a Bluetooth transceiver, or a Wi-Fi transceiver. In another example, the communication interface 210 may support wired communications, for example, via a network interface card. The electronic device 200 also includes a speaker 230, a processor 240, an input/output (I/O) interface (IF) 245, an input 250, a display 255, a memory 260, and sensor(s) 265. The memory 260 includes an operating system (OS) 261 and one or more applications 262.

For embodiments utilizing wireless communication, the communication interface 210 may receive an incoming RF signal such as a Bluetooth signal or a Wi-Fi signal. The communication interface 210 may down-convert the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data). The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The communication interface 210 receives the outgoing processed baseband or IF signal from the TX processing circuitry 215 and up-converts the baseband or IF signal to an RF signal that is transmitted via an antenna.

The processor 240 can include one or more processors or other processing devices and execute the OS 261 stored in the memory 260 in order to control the overall operation of the electronic device 200. The processor 240 is also capable of executing other applications 262 resident in the memory 260, such as, one or more applications for the generation and interactivity of cinemagrams as discussed in greater detail below.

The processor 240 can move data into or out of the memory 260 as required by an executing process. The processor 240 is also coupled to the I/O interface 245, which provides the electronic device 200 with the ability to connect to other devices, such as laptop computers and handheld computers. The I/O interface 245 is the communication path between these accessories and the processor 240.

The processor 240 is also coupled to the input 250 and the display 255. The operator of the electronic device 200 can use the input 250 to enter data and inputs into the electronic device 200. For example, the input 250 may be a touchscreen, button, keyboard, track ball, mouse, stylus, electronic pen, etc. The display 255 may be a liquid crystal display, light emitting diode display, or other display capable of rendering text and/or at least limited graphics, such as from web sites. The memory 260 is coupled to the processor 240. Part of the memory 260 could include a random access memory (RAM), and another part of the memory 260 could include a Flash memory or other read-only memory (ROM).

Electronic device 200 further includes one or more sensor(s) 265 that are operably connected to the processor 240. For example, the sensor(s) 265 detect some measureable effect in proximity to the electronic device 200. The sensor(s) 265 may include inertial sensors (e.g., accelerometers, gyroscope, magnetometer), optical sensors, motion sensors, cameras, pressure sensors, heart rate sensors, altimeter, breath sensors (e.g., microphone 220), etc. As discussed in greater detail below, in various embodiments, the sensor(s) 265 may be used to identify occurrence of one or more semantic triggers for triggering the motion component of a cinemagram to provide interactivity.

Although FIG. 2 illustrates one example of electronic device 200, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). In another example, the electronic device may include an antenna or a set of multiple antennas. Also, while FIG. 2 illustrates the electronic device 200 configured as a mobile telephone or smartphone, electronic devices could be configured to operate as other types of mobile, stationary devices, or electronic devices for generating or interacting with cinemagrams.

As will be discussed in greater detail below, embodiments of the present disclosure provide for interactivity of cinemagrams. Embodiments of the present disclosure provide improved cinemagram generation quality with object segmentation and tracking of moving object across frames such that motion regions across multiple frames with significant displacement can still be blended to form a cinemagram. In various embodiments, the interactive cinemagram generation may be performed using an automatic mode (e.g., as illustrated in FIG. 3 below) that does not require an input from a user to generate the cinemagram or using a manual mode (e.g., as illustrated in FIG. 4 below) that requests one or more inputs from a user at one or more points during the generation of the cinemagram.

Figure 3:
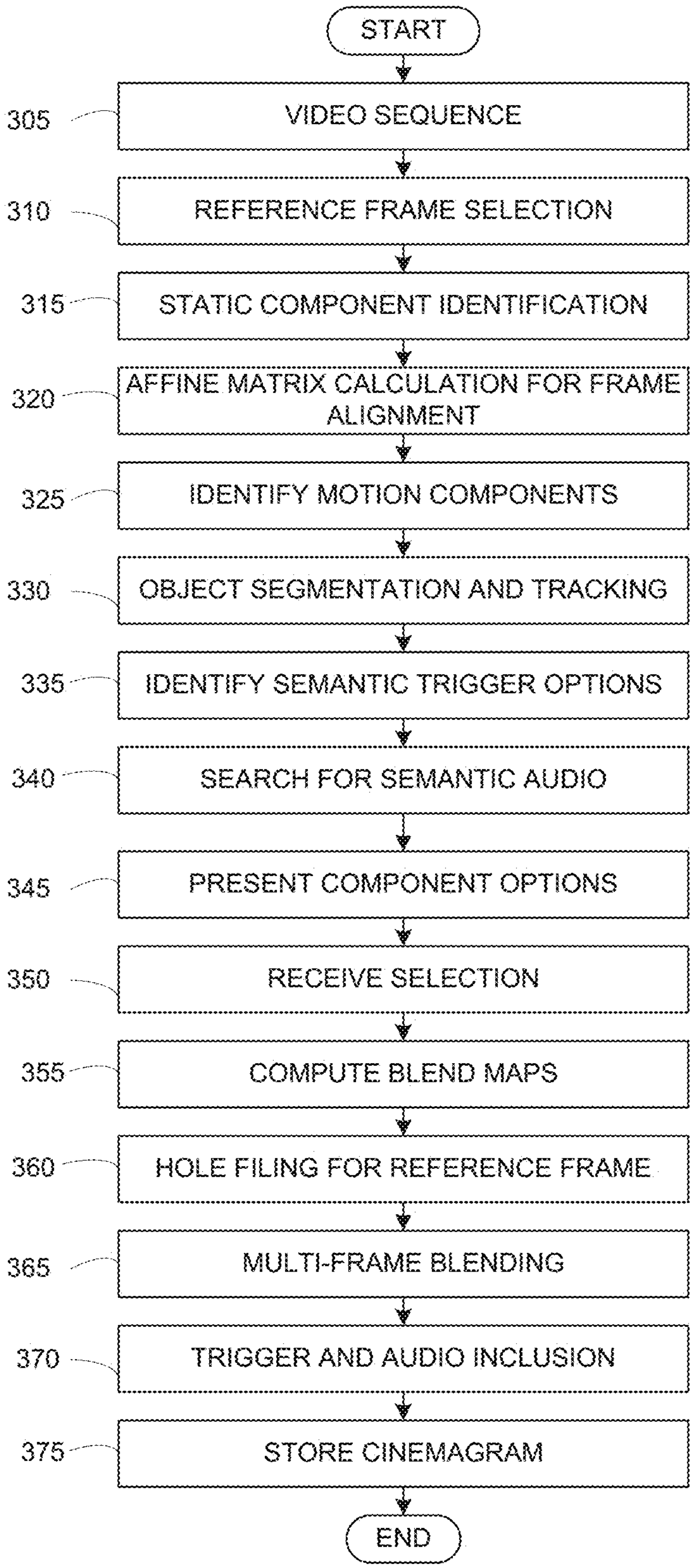
FIG. 3 illustrates a flowchart of a process for an automatic mode for generation of interactive cinemagrams in accordance with various embodiments of the present disclosure.
Figure 4:
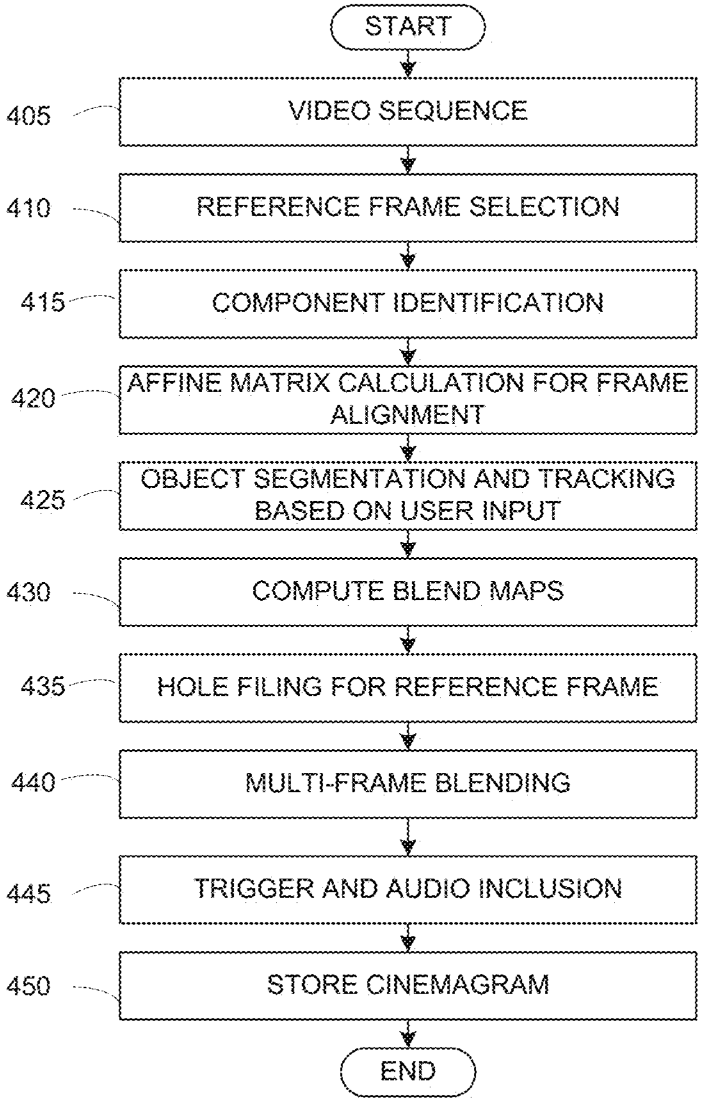
FIG. 4 illustrates a flowchart of a process for a manual mode for generation of interactive cinemagrams in accordance with various embodiments of the present disclosure.
Figure 5A:
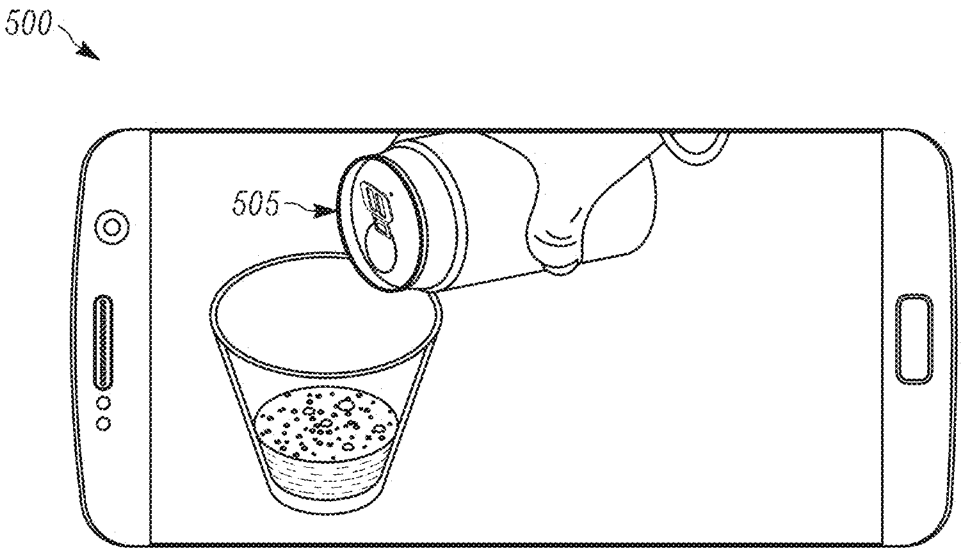
FIGS. 5A and 5B illustrate an example of cinemagram interactivity in accordance with one or more embodiments of the present disclosure.
Figure 5B:
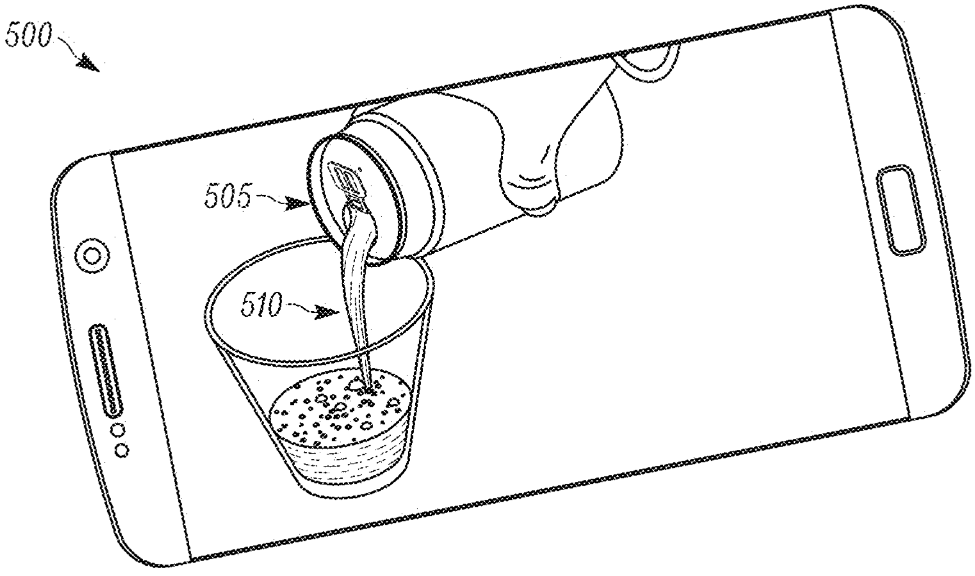

FIG. 3 illustrates a flowchart of a process for an automatic mode for generation of interactive cinemagrams in accordance with various embodiments of the present disclosure. For example, the process depicted in FIG. 3 is described as implemented by the electronic device 200 in FIG. 2. The process may also be implemented by any of the devices 106-115 in FIG. 1.

For the automatic mode, the process begins with the electronic device 200 receiving a video sequence (step 305). In step 305, any type of video or image data may be used. For example, the video sequence may be a series of sequential frames stored as a video file or a graphics interchange format (GIF) file. The frames may be individual images or video frames with interdependencies. The electronic device 200 then performs reference frame selection (also may be called a key frame or background frame) (step 310). For example, in step 310, the electronic device 200 may select the reference frame selection based on image quality and location of certain motion components. For instance, for a cinemagram with a looping component that has a starting point, the reference frame would be picked as close to the starting point of the looping component as possible. In another example, an image of high quality or low amount of area in which movement occurs over the course of the sequence may be selected.

Thereafter, the electronic device 200 performs static component identification (step 315). For example, in step 315, the electronic device 200 identifies the portions of the reference frame that are relatively constant or do not move over the course of the video sequence. The electronic device 200 then performs affine matrix calculation for frame alignment (step 320). For example, in step 320, the electronic device 200 may compute the affine matrix to align frames other than the reference frame with the reference frame. The electronic device 200 computes the affine matrix based on tracking of the location of the static components of the reference frame over the course of the video sequence. Frame alignment can compensate for movement of the camera that occurred during generation of the video sequence. For example, frame alignment can improve tracking of objects that move throughout the video sequence relative to their position in the reference frame.

Thereafter, the electronic device 200 identifies motion components (step 325). For example, in step 325, the electronic device 200 identifies which regions or areas of the video sequence are in motion over the duration of the sequence after the frame alignment. The electronic device 200 performs object segmentation and tracking (step 330). For example, in step 330, the electronic device 200 selects from the motion components one or more objects to track over the course of the video sequence to form the motion component of the cinemagram. The object selection may be performed automatically based on amount of movement or, as will be discussed in greater detail below, a deep learning process to identify which object animation will produce a quality cinemagram. Object selection may also be performed manually based on a user's selection as will be discussed in greater detail below. As part of this step, the electronic device 200 segments or removes the moving object from the frames to form a series of frame segments that show motion or animation of the object over the sequence.

In some embodiments, the cinemagram creator can indicate an alternate trajectory or motion pattern for one or more of the motion components and based on the motion patterns learned from the video sequence, the electronic device 200 can apply perspective transformations and occlusion effects to render the desired cinemagram. These embodiments differ from the usual definition of cinemagrams since the motion patterns are not solely based on the recorded video sequence but allow for greater creativity and freedom for the user to create intriguing cinemagrams. In other embodiments, the processes disclosed herein can be used to create three dimensional (3D) cinemagrams, for example, where the motion component has the effect of moving into or out of the screen. Additionally, cinemagrams can be made for augmented reality (AR) or virtual reality (VR) environments to make cinemagrams that can be consumed in these formats.

Thereafter, the electronic device 200 identifies semantic trigger options (step 335). As used herein, semantic trigger options are options for events that trigger animation of a cinemagram that are logically related to the cinemagram animation. In various embodiments, the present disclosure provides for the interactivity of cinemagrams through the use of semantic triggering of the motion component of the cinemagram. In this manner, the cinemagram provides a high level of interactivity through the semantic link between the action triggering the motion and the motion of the cinemagram.

FIGS. 5A-6B illustrate examples of cinemagram interactivity in accordance with one or more embodiments of the present disclosure. In the example illustrated by FIGS. 5A and 5B, tilting of the phone 500 triggers the flow of liquid 510 in the cinemagram. For example, the phone 500 may be implemented by electronic device 200 that includes sensors 265, such as inertial sensors, to detect changes in orientation. When the orientation change is detected or meets or exceeds some threshold values, the electronic device 200 triggers the motion component of the cinemagram—the flow of liquid 510 from the can 505 in this illustrative example. Additionally, the rate or amount of orientation change may be proportional to the speed at which the motion component is played. For example, when the phone is tipped well past vertical or rapidly, the electronic device 200 may speed up the rate at which the motion component is played to give the effect that the liquid is being poured more quickly and vice versa for a slower effect.

Figure 6A:
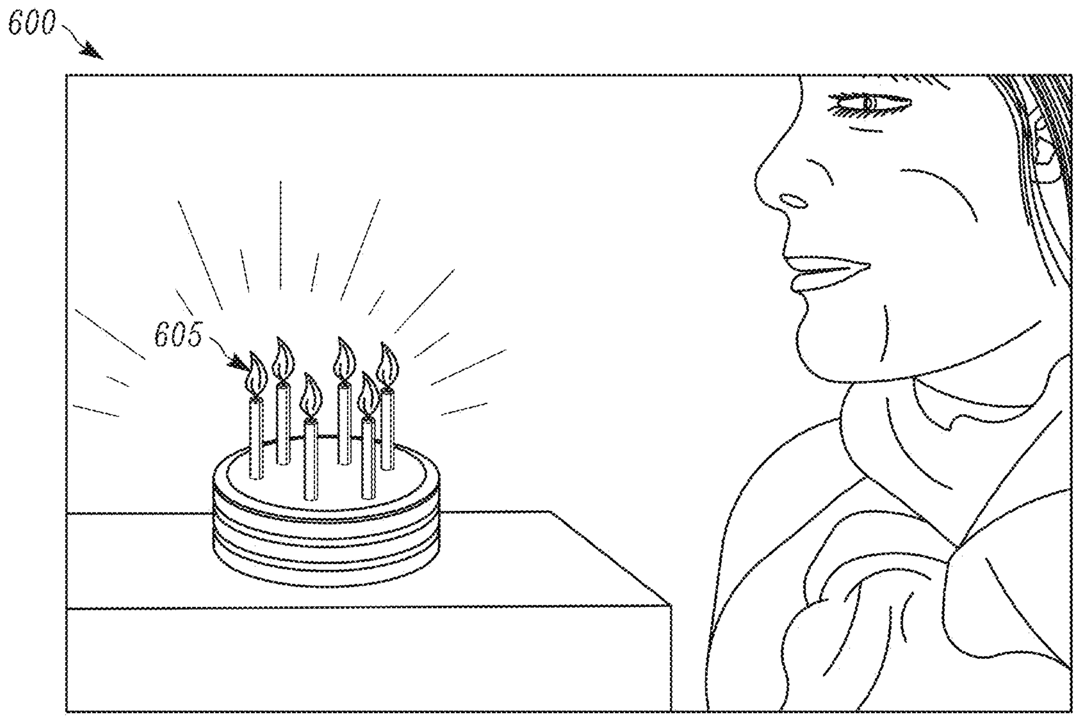
FIGS. 6A and 6B illustrate another example of cinemagram interactivity in accordance with one or more embodiments of the present disclosure.
Figure 6B:
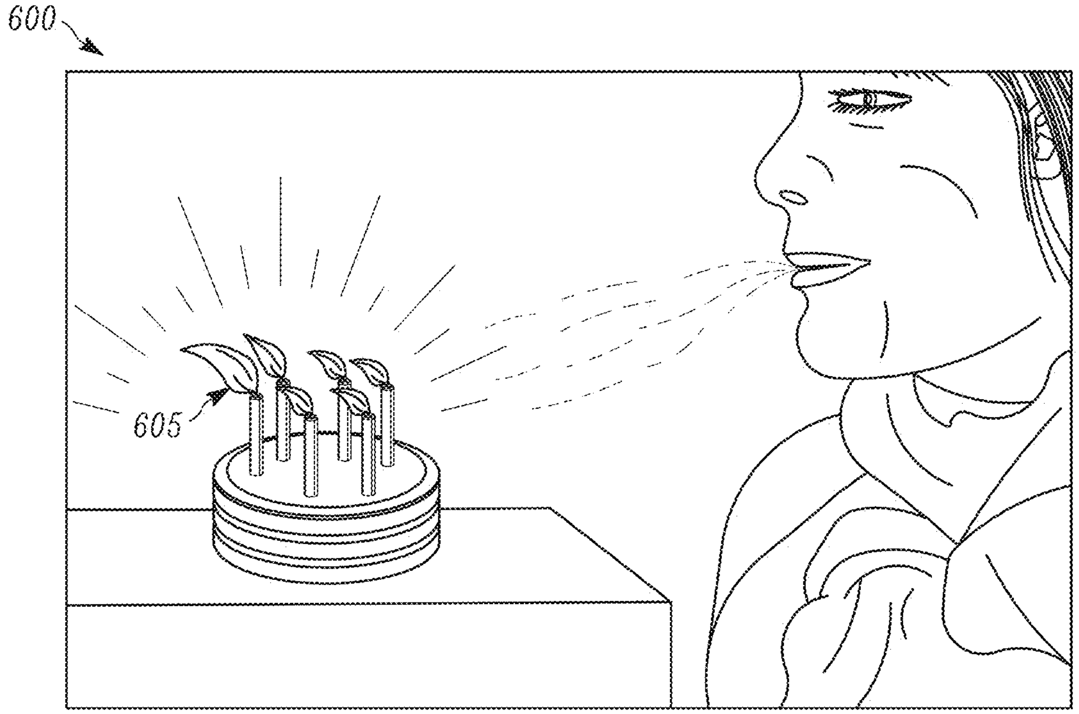

In the example illustrated by FIGS. 6A and 6B, blowing on the screen 600 triggers the movement of the candles 605 simulating blowing out of candles 605 on a cake. For example, the electronic device 200 may include sensors 265, such as a breath sensor or microphone, to detect a sound for the user blowing to trigger the motion component. Similarly, a harder detected blowing may cause motion component to move quicker and vice versa. While the can tipping and candle blowing examples are illustrated, these are just examples and not a limitation on the number and types of additional embodiments are provided by the present disclosure. For example, tapping or hovering on an object detected by a proximity or touch sensor (e.g., such as a capacitive or inductive touch screen included in input 250, a discrete proximity or touch sensor included in sensors 265, a camera, etc.) can trigger motion of that object. In other embodiments, the electronic device 200 may use a forward facing camera and image processing of images of a user of the electronic device 200 viewing and interacting with the displayed cinemagram to detect more complicated user actions as triggers. For example, a wink, smile, wave, or blowing of a kiss by a user can be detected by the electronic device 200 using image processing and pattern matching to trigger a displayed cinemagram of a loved one performing a corresponding action.

The electronic device 200 performs searches for semantic audio (step 340). For example, in step 340, the electronic device 200 may use deep learning processes to automatically tag a type of motion component and use the tag to search an audio database and provide users the option to add meaningful audio to the motion component of the cinemagram. For instance, the electronic device 200 may tag the motion component as a waterfall and then search an audio tagged database for the sound of waterfall to create a cinemagram with an animated waterfall. In another example, the electronic device 200 may use deep learning processes to identify characteristics of the overall cinemagram including static components, e.g., based on the reference frame, and identify appropriate background audio to add.

As part of step 335, the electronic device 200 identifies the type of cinemagram and motion therein to identify the semantic trigger options. For example, as discussed above, the trigger is semantically linked to the type and motion of the cinemagram. The electronic device 200 may automatically recognize the type and motion of the cinemagram and the various different types of triggering actions. In one example, the electronic device 200 may use a table correlating semantic linking between cinemagram motion types and trigger options to identify which trigger or triggers should be used. In another example, the electronic device 200 may provide a user with component options for user selection (step 345). The component options may include both triggering options as well as audio options. For example, the identified audio options could be presented to the user as a selection option in the creation process. In another example, identified audio may be automatically added if certain inclusion parameters are met. The electronic device 200 receives a selection of a component option (step 350), which may include a selection of one or more semantic triggers and/or semantic audio for cinemagram interactivity.

Thereafter, the electronic device 200 computes blend maps (step 355) and performs hole filling for the reference frame (step 360). In these steps, the electronic device 200 performs blending in of the motion component to produce a high quality image with little or no artifacts as a result of the segmentation and blending. When the motion component is confined to a particular area of the reference frame, the blending may be a straight forward blending of the motion area into the remainder of the reference frame, for example, via alignment (spatial and temporal) and smoothing of boundaries. However, when objects have substantial motion including a large displacement across frames, the blending is more complex.

Embodiments of the present disclosure provide semantic object segmentation and tracking across frames so that objects with large displacement across frames can still be blended into the cinemagram. For example, as part of step 355, the electronic device 200 determines whether movement of objects will uncover portions of the reference frame that will not include pixel information at one or more points during the animation. If so, as part of step 360, the electronic device 200 will fill these uncovered portions from portions of other frames or by interpolation based on nearby pixels, for example, to perform hole filling.

Figure 7A:
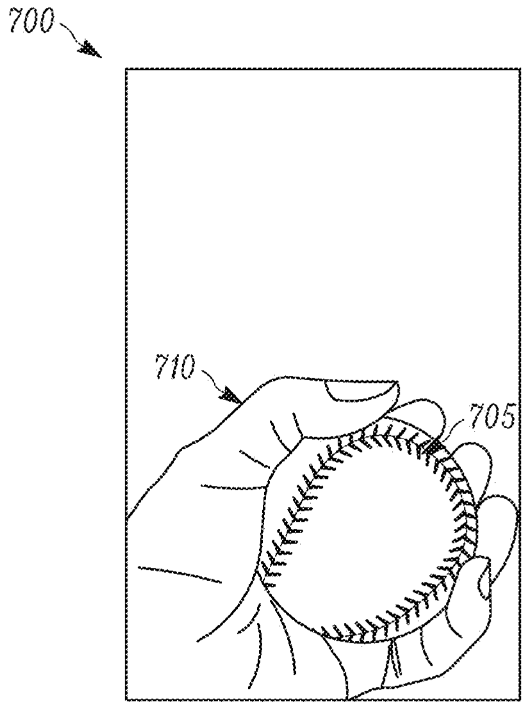
FIGS. 7A and 7B illustrate a visual example of pixel information missing from a reference frame during playing of a cinemagram.
Figure 7B:
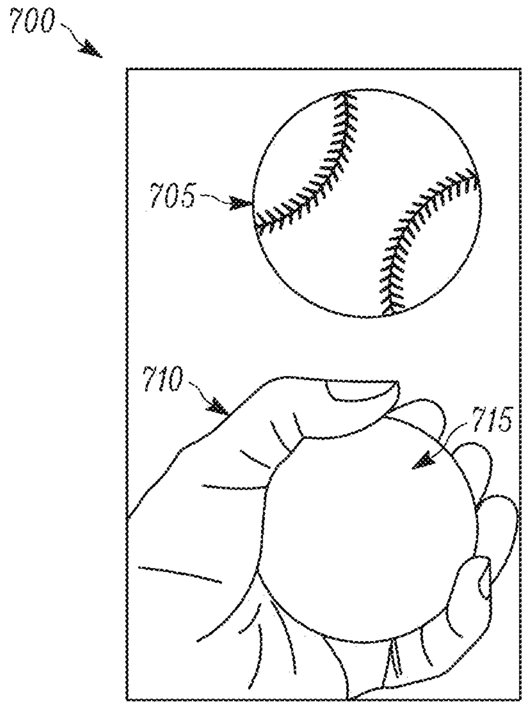

The desire for hole filling arises when multi-frame blending alone will not provide the information needed. Such an example of pixel information missing from a reference frame during playing of a cinemagram is illustrated in FIGS. 7A and 7B. In this illustrative example where the video sequence is of a person is throwing a ball 705 up in the air, both the hand 710 of the subject and the ball 705 are moving. If the creator of the cinemagram decides to only have the ball 705 move but keep the hand 710 stationary then in frames other than the reference frame where the ball 705 is in the subjects hand 710, the palm of the user has a hole 715 because the ball 705 is segmented and removed for the static component used for blending in frames other than the reference frame. As depicted, if the reference frame 700 is chosen as shown in FIG. 7A and the motion component is the ball 705 being thrown up in the air, when the ball 705 has been segmented from the reference frame 700, a hole 715 exists for points during the animation of the ball movement other than the reference frame as illustrated in FIG. 7B. In this example, blending the motion component across frames may not fill in this hole 715 since the hand 710 is also moving across the other frames and is not in the same location. Accordingly, the electronic device 200 can track the motion of the hand 710 across several frames, which would otherwise be considered a static component for this cinemagram, to identify the pixel information to fill the hole 715 in the static portion from the reference frame used for blending. In particular, the electronic device 200 may identify pixels corresponding to the inner palm of the tracked hand 710 in other frames and use this pixel information to fill the hole 715 in the static portion of the reference frame as part of blending.

The electronic device 200 then performs multi-frame blending (step 365). For example, the electronic device 200 may perform blending in at least one of two ways. In a first example, the motion component from each frame is blended into a copy of the static component creating the frames of the cinemagram. In a second example, a static part (this can be a single instance of a moving component) can be blended into subsequent frames. This second example implementation may be useful for cinemagrams with a large quantity of small objects that are moving and are not localized and there is a centerpiece that the user wants to keep static across frames. Based on the type of video sequence, the electronic device 200 may present the user with a choice between the two blending options. In the automatic mode, the electronic device 200 may select the blending option without a user selection. In this example, the electronic device 200 uses a deep learning process to identify components that may make an aesthetically pleasing cinemagram. The motion components would also be analyzed to determine which type of blending would yield a better quality cinemagram. In the automatic mode, the electronic device 200 could also determine what blend types are available and provide as an option to the user.

As used herein, deep learning is a type of machine learning that utilizes a series of examples along with feedback to produce an objectively better output. For example, without limitation, when referring to cinemagrams a better looking or better quality cinemagram may refer the image quality resulting from the cinemagrams, such as, for example, reduction in pixilation or artifacts, and/or refer to the quality of the motion effect in the cinemagram, such as, for example, being aesthetically pleasing. While parts of this analysis may be considered subjective, certain types of cinemagrams can be rated and based on comparison of a type of cinemagram or motion therein being created to rate cinemagrams, an objectively better quality cinemagram can be produced.

Embodiments of the present disclosure further provide deep learning techniques to automatically identify regions that are better candidates for the different components of the cinemagram, which may be utilized as part of steps 315-320 to identify or provide options for component selection. For example, embodiments of the present disclosure utilize such deep learning techniques to automatically determine different components of the cinemagram such as the static and motion components while incorporating physical constraints and artistic or aesthetic considerations.

Embodiments of the present disclosure further utilize deep learning techniques for semantically segmenting objects. Embodiments of the present disclosure recognize that motion might cause components to change shape, color, pattern etc. For example, clothes blowing in the wind show deformation in shape and a moving ball that's also rotating might show different patterns or colors. Accordingly, embodiments of the present disclosure use deep learning techniques and networks to semantically segment objects in the image. For example, if the region around the segmented object remains the same between two frames then blending the two frames is straight forward but if the movement of the object reveals holes in the reference frame, the electronic device 200 uses the hole filling techniques described above. Once objects are segmented (especially objects in motion) in each frame, tracking across frames is easier.

Thereafter, the electronic device 200 performs trigger and audio inclusion (step 370). For example, in step 370, the electronic device 200 may include within metadata for the cinemagram an identifier of the trigger and audio if included. The metadata may include properties of the trigger, such as, for example and without limitation, type of trigger, what sensor outputs to identify, threshold values for triggering, whether the speed of the cinemagram is proportionate to the sensed outputs, and associated values therefore. Additionally, the metadata may include the audio or an identifier or tag for the audio to be triggered. For example, the identifier or tag may be a reference to a database where the audio may be retrieved from such as a uniform resource identifier (URI). The metadata associated with the created cinemagram may also include informational assistance on how to trigger the cinemagram. For example, the electronic device 200 displaying the cinemagram may display an identifier or suggested action for a user to perform to trigger the cinemagram if, for example, the user is having difficulty identifying the trigger.

Thereafter, the electronic device 200 stores the cinemagram (step 375). For example, in step 375, the electronic device 200 may store the cinemagram in any file format for media files. The created cinemagram can later be transmitted to any device (e.g., any of client devices 106-115) for display and triggering or may be displayed and triggered on the electronic device 200 that created the cinemagram.

FIG. 4 illustrates a flowchart of a process for a manual mode for generation of interactive cinemagrams in accordance with various embodiments of the present disclosure. For example, the process depicted in FIG. 4 is described as implemented by the electronic device 200 in FIG. 2. The process may also be implemented by any of the devices 106-115 in FIG. 1. In FIG. 4, several steps of the process may be performed similarly to or the same as steps discussed above with regard to FIG. 3. In the interests of brevity, the descriptions of corresponding steps from FIG. 3 are not repeated but rather incorporated by reference here into the discussion of FIG. 4.

The process begins with the electronic device 200 receiving a video sequence (step 405) similarly to step 305. The electronic device 200 performs reference frame selection (step 410). For example, in step 410, the electronic device 200 may receive a user input including selection of the reference frame or the reference frame may be selected by the electronic device similarly to step 310.

Figure 8:
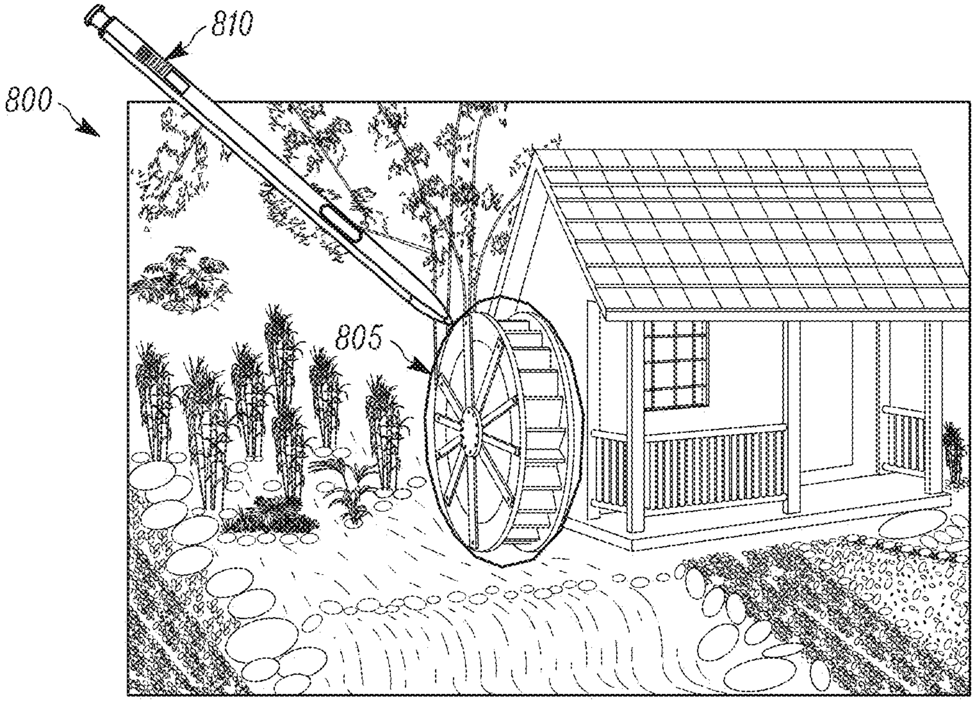
FIG. 8 illustrates an example of assisted segmentation for cinemagram generation which may be utilized in accordance with one or more embodiments of the present disclosure.

Thereafter, the electronic device 200 receives a component selection (step 415). For example, in step 415, the electronic device 200 may receive a user input including a selection of the cinemagram components including the motion and/or static components. For example, the user may select either or both of the motion and static components via object section inputs. FIG. 8 illustrates an example of assisted segmentation for cinemagram generation. For example, the user may select one or more objects 805 for the motion component and the electronic device may identify that any non-selected areas of the reference frame 800 to be the static component. In the manual mode, the electronic device 200 may receive an input from a user to provide more accurate input to the segmentation component of the process. For example, further improvement object segmentation for defining the motion and static components can be achieved using a tool 810, such as an electronic pen or stylus, which can better localize and follow the contour of the object 805.

The electronic device 200 then performs affine matrix calculation for frame alignment (step 420) and object segmentation and tracking based on user input (step 425) similarly to steps 320 and 330, but using the user selected components and objects as discussed with regard to step 415. Thereafter, the electronic device 200 computes blend maps (step 430); performs hole-filling for the reference frame (step 435); and performs multi-frame blending (step 440) similarly to steps 355, 360, and 365, respectively, based on the user selected component(s) as discussed with regard to step 415.

The electronic device 200 performs trigger and audio inclusion (step 445). For example, in step 445, the electronic device 200 may identify semantic triggers and audio to include similarly to step 370 discussed above. However, additionally or instead, the electronic device 200 may receive one or more user selections including audio cues and triggers to use for the cinemagram. For example, the selection may be an input of the type of trigger to use from a list of presented trigger options or a manual input defining trigger properties such as a user action to detect, sensors, and/or associated sensor values. Also, for example, the audio cues may be an identifier of an audio file, a search input for a type of audio, and/or an indication of a specific area in the image that the audio should be based on (e.g., a tap on a waterfall depicted in an image coupled with feature extraction by the electronic device 200 to determine that a waterfall sound is desired). Thereafter, the electronic device 200 stores the cinemagram (step 450) similarly to step 450.

Although FIGS. 4 and 5 illustrate examples of processes for an automatic mode and a manual mode for generation of interactive cinemagrams, respectively, various changes could be made to FIGS. 4 and 5. For example, while shown as a series of steps, various steps in each figure could overlap, occur in parallel, occur in a different order, or occur multiple times. In another example, steps may be omitted or replaced by other steps.

Figure 9:
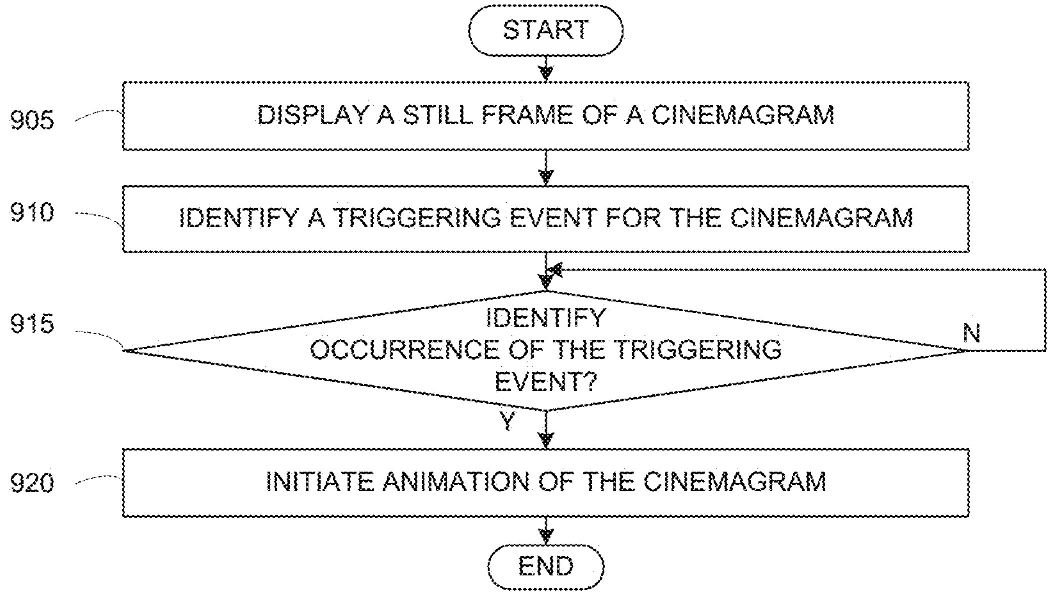
FIG. 9 illustrates a flowchart of a process for interactive cinemagrams in accordance with various embodiments of the present disclosure.

FIG. 9 illustrates a process for interactive cinemagrams in accordance with various embodiments of the present disclosure. For example, the process depicted in FIG. 9 is described as implemented by the electronic device 200 in FIG. 2 on which a user is viewing and interacting with a created cinemagram. The process may also be implemented by any of the devices 106-115 in FIG. 1.

The process begins with the electronic device 200 displaying a still frame of a cinemagram (step 905). For example, in step 905, the electronic device 200 may display an image having a portion that can be animated but is not presently animated. In other words, the cinemagram has not yet been triggered to play. The animated portion can be a repeated video sequence or GIF. In some instances, the still frame may be the reference frame. In other instances, the still frame could be a frame of the cinemagram frozen at any point during the animation of the cinemagram. For example, if the triggering event is no longer sensed, the electronic device 200 may pause or freeze the animation of the cinemagram and await another occurrence of the triggering event as discussed below with regard to step 915. The electronic device 200 then identifies a triggering event for the cinemagram (step 910). For example, in step 910, the electronic device 200 may determine what actions of a user should occur in order to trigger playing of the cinemagram. For example, the electronic device 200 may identify the type of triggering event for the cinemagram from metadata associated with the cinemagram. The metadata may indicate a type of event and/or sensor values as the triggering event. As part of this step, the electronic device 200 may also identify audio for the cinemagram, for example, based on metadata associated with the cinemagram. In one example, the metadata may contain a tag or identifier for audio to be retrieved from a database. In this example, the electronic device 200 may retrieve this audio in anticipation of occurrence of the triggering event. In another example, the audio may be included or embedded with the cinemagram (e.g., part of the file for the cinemagram) similar to audio included with videos.

Thereafter, the electronic device 200 determines whether the triggering event has occurred (step 915). For example, in step 915, the electronic device 200 may identify the occurrence based on an input from one or more sensors. In one example, the sensor is a motion sensor and the triggering event is based on sensed movement or orientation change of the electronic device. In another example, the sensor is a camera and the triggering event is based on detection of an action performed by the user via image/vision processing and recognition. If no occurrence of the triggering event was identified, the electronic device 200 may continue to monitor for occurrence of the triggering event while the untriggered cinemagram is displayed.

If occurrence of the triggering event was identified, the electronic device 200 initiates animation of the cinemagram (step 920). For example, in step 920, the electronic device 200 may play the motion component of the cinemagram in response to identifying the occurrence of the triggering event. If audio is part of the cinemagram, as part of this step, the electronic device 200 may initiate play of the audio for the image in response to identifying the occurrence of the triggering event. In some embodiments, different triggers may be defined, identified, and used to trigger the animation and audio.

Figure 10:
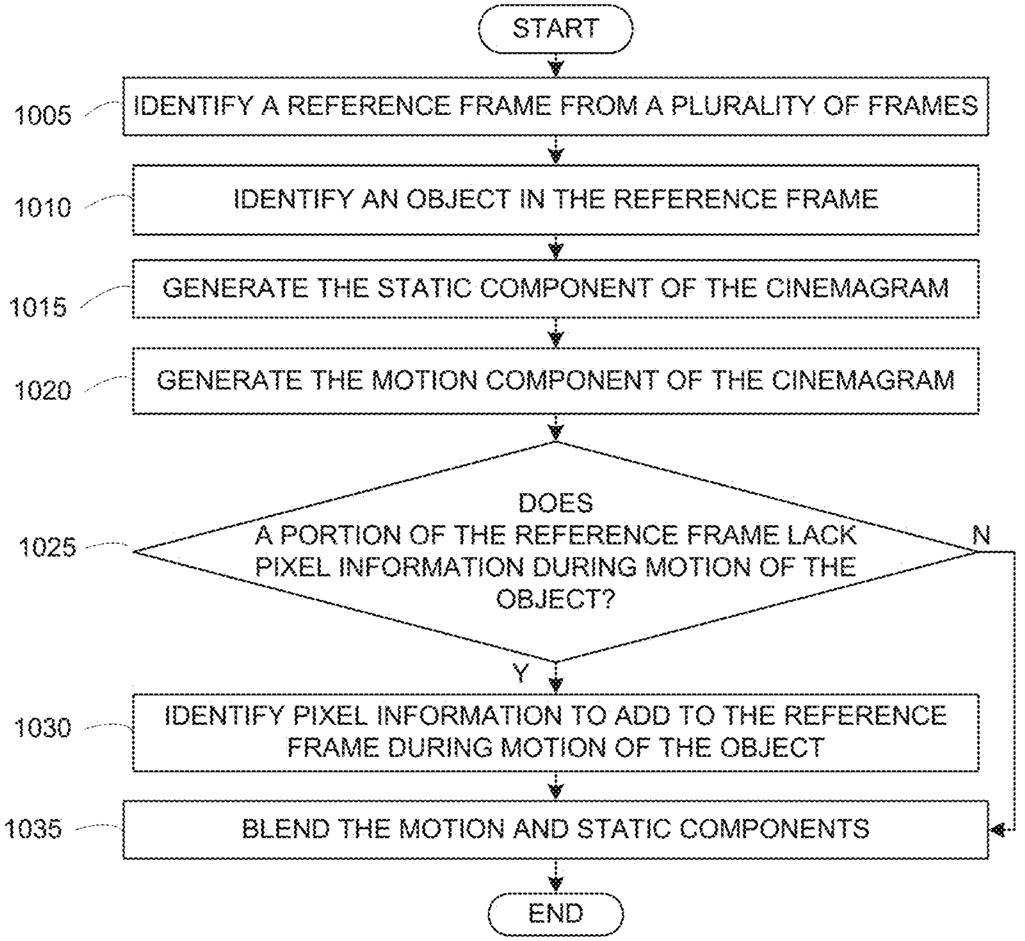
FIG. 10 illustrates a flowchart of a process for generating a cinemagram in accordance with various embodiments of the present disclosure.

FIG. 10 illustrates a process for generating a cinemagram in accordance with various embodiments of the present disclosure. For example, the process depicted in FIG. 10 is described as implemented by the electronic device 200 in FIG. 2. The process may also be implemented by any of the devices 106-115 in FIG. 1.

The process begins with the electronic device 200 identifying a reference frame from a plurality of frames (step 1005). For example, in step 1005, the electronic device 200 may identify a starting frame from a short video clip of GIF file as the reference frame. The electronic device 200 then identifies at least one object in the reference frame (step 1010). For example, in step 1010, the electronic device 200 may automatically identify the object based on analysis of moving objects or may receive a selection from a user, for example, via a stylus. The object is selected to be at least a part of the motion component to be animated in the cinemagram. Before generation of the cinemagram, the electronic device 200 may also use deep learning techniques and analyze multiple objects movement across the plurality of frames to generate a recommendation of one or more objects to be animated for the cinemagram.

Thereafter, the electronic device 200 generates a static component of the cinemagram (step 1015). For example, in step 1015, the electronic device 200 may generate the static component by segmenting the identified object from the reference frame. The electronic device 200 then generates the motion component of the cinemagram (step 1020). For example, in step 1020, the electronic device 200 may track the segmented object across multiple frames throughout the video sequence.

Thereafter, the electronic device 200 determines whether a portion of the reference frame lacks pixel information during motion of the object (step 1025). For example, in step 1025, the electronic device 200 may determine whether the motion component of the cinemagram moves to other areas of the reference frame resulting in lack of pixel information due to the segmentation of the object from the reference frame. If 'no' at step 1025 (e.g., no hole was determined to have been created during the cinemagram), the process proceeds to step 1035 where the electronic device generates the cinemagram via blending of the motion and static components.

If 'yes' at step 1025 (e.g., a hole was determined to have been created during the cinemagram that needs to be), the electronic device 200 identifies pixel information to add to the reference frame during motion of the object (step 1030). For example, in step 1030, the electronic device 200 may identify the portion of the reference frame (e.g., the hole) in multiple of the frames other than the reference frame and identify the pixel information for the portion of the reference frame (e.g., the pixel information to use for hole filling) based on pixel information for the portion in the other frames. In another example, the electronic device 200 may fill the pixel information into the portion of the reference frame using nearby pixel interpolation. Thereafter, the electronic device 200 blends of the motion and static components to create the cinemagram (step 1035).

Although FIGS. 9 and 10 illustrate examples of processes for interactive images and generating a cinemagram, respectively, various changes could be made to FIGS. 9 and 10. For example, while shown as a series of steps, various steps in each figure could overlap, occur in parallel, occur in a different order, or occur multiple times. In another example, steps may be omitted or replaced by other steps.

Embodiments of the present disclosure provide for interactivity and use of audio to add additional dimensions to cinemagrams. The automatic detection, segmentation and tracking of various cinemagram components provided by the present disclosure allow for increase in ease of creating cinemagrams. In the manual mode, the use of stylus as disclosed herein enables more precise segmentation.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for interactive cinemagrams, the method comprising:

identifying a reference frame from a plurality of frames and an object in the reference frame;

generating a motion component of a cinemagram by tracking the object across multiple of the frames;

determining whether a portion of the reference frame lacks pixel information during motion of the object for the motion component of the cinemagram;

identifying pixel information to add to the portion of the reference frame during motion of the object;

displaying a still image frame of the cinemagram on a display of an electronic device;

identifying a triggering event for initiating animation of the motion component of the cinemagram from metadata associated with the cinemagram;

after displaying the still image frame, identifying occurrence of the triggering event based on an input from one or more sensors of the electronic device; and initiating animation of the motion component of the cinemagram while displaying a portion of the still image frame in a remaining portion of the cinemagram in response to identifying the occurrence of the triggering event.

2. The method of claim 1, further comprising:
identifying audio for the cinemagram based on the metadata associated with the cinemagram; and
initiating play of the audio for the cinemagram in response to identifying the occurrence of the triggering event.

3. The method of claim 1, wherein:
the cinemagram further includes a static component, and
the method further comprises generating the static component by segmenting the object from the reference frame.

4. The method of claim 1, wherein identifying the pixel information to add to the portion of the reference frame during motion of the object comprises:
identifying the portion of the reference frame in multiple of the frames other than the reference frame; and
identifying the pixel information for the portion of the reference frame based on pixel information for the portion in the other frames.

5. The method of claim 1, wherein identifying the pixel information to add to the portion of the reference frame during motion of the object comprises filling the pixel information into the portion of the reference frame using nearby pixel interpolation.

6. The method of claim 1, further comprising:
before generating the cinemagram, analyzing movement of multiple objects across the plurality of frames; and
generating a recommendation of one or more objects to be animated for the motion component of the cinemagram.

7. The method of claim 1, wherein at least one of:
the one or more sensors include a microphone and the triggering event is based on sound sensed by the microphone; and
the one or more sensors include a touch sensor and the triggering event is based on touch sensed by the touch sensor.

8. The method of claim 1, wherein the one or more sensors include a motion sensor and the triggering event is based on sensed movement of the electronic device.

9. An electronic device comprising:
a display configured to display a still image frame of a cinemagram;
one or more sensors; and
a processor operably connected to the display and the one or more sensors, the processor configured to:
identify a reference frame from a plurality of frames and an object in the reference frame;
generate a motion component of the cinemagram by tracking the object across multiple of the frames;
determine whether a portion of the reference frame lacks pixel information during motion of the object for the motion component of the cinemagram;
identify pixel information to add to the portion of the reference frame during motion of the object;
identify a triggering event for initiating animation of the motion component of the cinemagram from metadata associated with the cinemagram;
identify, after display of the still image frame, occurrence of the triggering event based on an input from the one or more sensors; and
initiate, in response to identification of the occurrence of the triggering event, animation of the motion component of the cinemagram by the display while displaying a portion of the still image frame in a remaining portion of the cinemagram.

10. The electronic device of claim 9, wherein the processor is further configured to:
identify audio for the cinemagram based on the metadata associated with the cinemagram; and
initiate play of the audio for the cinemagram in response to identifying the occurrence of the triggering event.

11. The electronic device of claim 9, wherein:
the cinemagram further includes a static component, and
the processor is further configured to generate the static component by segmenting the object from the reference frame.

12. The electronic device of claim 9, wherein to identify the pixel information to add to the portion of the reference frame during motion of the object, the processor is further configured to:
identify the portion of the reference frame in multiple of the frames other than the reference frame; and
identify the pixel information for the portion of the reference frame based on pixel information for the portion in the other frames.

13. The electronic device of claim 9, wherein to identify the pixel information to add to the portion of the reference frame during motion of the object, the processor is further configured to fill the pixel information into the portion of the reference frame using nearby pixel interpolation.

14. The electronic device of claim 9, wherein the processor is further configured to:
before generation of the cinemagram, analyze movement of multiple objects across the plurality of frames; and
generate a recommendation of one or more objects to be animated for the motion component of the cinemagram.

15. The electronic device of claim 9, wherein at least one of:
the one or more sensors include a microphone and the triggering event is based on sound sensed by the microphone; and
the one or more sensors include a touch sensor and the triggering event is based on touch sensed by the touch sensor.

16. The electronic device of claim 9, wherein the one or more sensors include a motion sensor and the triggering event is based on sensed movement of the electronic device.

17. A non-transitory, computer-readable medium comprising computer code that, when executed by at least one processor of an electronic device, causes the electronic device to:
identify a reference frame from a plurality of frames and an object in the reference frame;
generate a motion component of a cinemagram by tracking the object across multiple of the frames;
determine whether a portion of the reference frame lacks pixel information during motion of the object for the motion component of the cinemagram;
identify pixel information to add to the portion of the reference frame during motion of the object;
cause a display of the electronic device to display a still image frame of the cinemagram;
identify a triggering event for initiating animation of the motion component of the cinemagram from metadata associated with the cinemagram;
identify, after display of the still image frame, occurrence of the triggering event based on an input from one or more sensors of the electronic device; and
initiate, in response to identification of the occurrence of the triggering event, animation of the motion component of the cinemagram by the display while displaying a portion of the still image frame in a remaining portion of the cinemagram.

18. The non-transitory, computer-readable medium of claim 17, further comprising computer code that, when executed by the at least one processor, causes the electronic device to:

identify audio for the cinemagram based on the metadata associated with the cinemagram; and initiate play of the audio for the cinemagram in response to identifying the occurrence of the triggering event.

19. The non-transitory, computer-readable medium of claim 17, wherein:

the cinemagram further includes a static component, and the non-transitory, computer-readable medium further comprises computer code that, when executed by the at least one processor, causes the electronic device to generate the static component by segmenting the object from the reference frame.

20. The non-transitory, computer-readable medium of claim 17, wherein the computer code that, when executed by the at least one processor, causes the electronic device to identify the pixel information to add to the portion of the reference frame during motion of the object, comprises computer code that, when executed by the at least one processor, causes the electronic device to:

identify the portion of the reference frame in multiple of the frames other than the reference frame; and identify the pixel information for the portion of the reference frame based on pixel information for the portion in the other frames.

21. The non-transitory, computer-readable medium of claim 17, wherein the computer code that, when executed by the at least one processor, causes the electronic device to identify the pixel information to add to the portion of the reference frame during motion of the object, comprises computer code that, when executed by the at least one processor, causes the electronic device to fill the pixel information into the portion of the reference frame using nearby pixel interpolation.

22. The non-transitory, computer-readable medium of claim 17, further comprising computer code that, when executed by the at least one processor, causes the electronic device to:

before generation of the cinemagram, analyze movement of multiple objects across the plurality of frames; and generate a recommendation of one or more objects to be animated for the motion component of the cinemagram.

23. The non-transitory, computer-readable medium of claim 17, wherein at least one of:

the one or more sensors include a microphone and the triggering event is based on sound sensed by the microphone; and the one or more sensors include a touch sensor and the triggering event is based on touch sensed by the touch sensor.

24. The non-transitory, computer-readable medium of claim 17, wherein the one or more sensors include a motion sensor and the triggering event is based on sensed movement of the electronic device.

* * * * *